US009459472B2

(12) United States Patent
Kim et al.

(10) Patent No.: US 9,459,472 B2
(45) Date of Patent: Oct. 4, 2016

(54) PRIVACY FILTER COMPRISING A WIRE GRID

(75) Inventors: Jae-Jin Kim, Daejeon (KR); Bu-Gon Shin, Daejeon (KR); Won-Jong Kwon, Daejeon (KR)

(73) Assignee: LG CHEM, LTD., Seoul (KR)

( * ) Notice: Subject to any disclaimer, the term of this patent is extended or adjusted under 35 U.S.C. 154(b) by 278 days.

(21) Appl. No.: 13/642,351

(22) PCT Filed: Apr. 22, 2011

(86) PCT No.: PCT/KR2011/002954
§ 371 (c)(1),
(2), (4) Date: Nov. 7, 2012

(87) PCT Pub. No.: WO2011/132992
PCT Pub. Date: Oct. 27, 2011

(65) Prior Publication Data
US 2013/0050798 A1    Feb. 28, 2013

(30) Foreign Application Priority Data

Apr. 22, 2010   (KR) ......................... 10-2010-0037568

(51) Int. Cl.
*G02F 1/153*   (2006.01)
*G02F 1/13*    (2006.01)

(52) U.S. Cl.
CPC ........... *G02F 1/1323* (2013.01); *G02F 1/1533* (2013.01); *G02F 2001/1536* (2013.01); *G02F 2201/44* (2013.01)

(58) Field of Classification Search
CPC .............. G02F 1/167; G02F 1/13306; G02F 2001/1678; G02F 2001/1672; G02F 2001/1676

USPC ............... 359/290–298, 237–254, 265–275; 345/107
See application file for complete search history.

(56) References Cited

U.S. PATENT DOCUMENTS

| 2002/0096985 A1 | 7/2002 | Hazzard |
| 2005/0213184 A1* | 9/2005 | Beteille et al. ............... 359/265 |
| 2008/0212160 A1* | 9/2008 | Fanton et al. ................ 359/273 |

(Continued)

FOREIGN PATENT DOCUMENTS

| CN | 101097265 A | 1/2008 |
| JP | 53-065096 | 6/1978 |
| JP | 60-081044 | 5/1985 |
| JP | 2003-131202 | 5/2003 |

(Continued)

*Primary Examiner* — Bumsuk Won
*Assistant Examiner* — Tamara Y Washington
(74) *Attorney, Agent, or Firm* — Dentons US LLP

(57) ABSTRACT

A privacy filter and its preparation method are disclosed. One embodiment of the privacy filter comprises: a first transparent substrate; a second transparent substrate positioned a predetermined distance apart from and opposite to the first transparent substrate; an electrolyte filled between the first and second transparent substrates; and a second transparent conductive layer disposed between the electrolyte and the second transparent substrate. The first transparent substrate comprises: an uneven pattern having a wire grid and trenches formed on the first transparent substrate; a first transparent conductive layer formed on the wire grid and the trenches of the uneven pattern; and an electrochromic layer being formed on the first transparent conductive layer along the sidewall of the wire grid and containing an electrochromic material to transmit or absorb visible light depending on whether an electrical signal is applied or not.

10 Claims, 5 Drawing Sheets

(56) References Cited

U.S. PATENT DOCUMENTS

| | | | |
|---|---|---|---|
| 2008/0310007 A1* | 12/2008 | Agrawal et al. | 359/275 |
| 2009/0009852 A1* | 1/2009 | Honeyman et al. | 359/296 |
| 2009/0153939 A1* | 6/2009 | Roh | 359/270 |
| 2009/0168140 A1* | 7/2009 | Chung | G02F 1/153 359/270 |

FOREIGN PATENT DOCUMENTS

| | | |
|---|---|---|
| JP | 2007-334279 | 12/2007 |
| KR | 1019990083058 | 11/1999 |
| KR | 10-2008-0001522 | 1/2008 |
| KR | 10-2008-0051280 | 6/2008 |
| WO | 2009/095985 A1 | 8/2009 |

* cited by examiner

PRIVACY FILTER COMPRISING A WIRE GRID

This application is a National Stage Entry of International Application No. PCT/KR2011/002954, filed Apr. 22, 2011, and claims the benefit of Korean Application No. 10-2010-0037568, filed on Apr. 22, 2010, which are hereby incorporated by reference in its entirety for all purposes as if fully set forth herein.

TECHNICAL FIELD

The present invention relates to a privacy filter and its preparation method and, more particularly to a privacy filter and preparation method thereof, where the privacy filter uses an inorganic electrochromic material for a high-aspect-ratio uneven pattern to reduce the lateral transmission without deteriorating the front transmission, thereby enhancing the privacy mode function, achieving a fast switching between wide field mode and narrow field mode and securing excellences in filter performance and driving stability.

BACKGROUND ART

With an increased demand for strong privacy protection, a variety of related products have been developed in different fields. Among the privacy-preserving products, privacy filters that fit over a mobile phone or computer screen to block the lateral transmission and narrow the screen's viewing angle have been in increasing demand every year. Unfortunately, the viewing angle, once narrowed, is not restorable without eliminating the privacy filter from the screen, incurring inconvenience that the privacy filter has to be removed from the screen whenever the privacy protection function is not needed.

To remove the inconvenience, there has recently been developed a switchable privacy filter that does not involve add-on films but controls the viewing angle selectively according to the reception of electrical signals. Blocking the light for the switchable privacy filters can be achieved in different ways, such as using PDLC (Polymer Dispersed Liquid Crystal) or PNLC (Polymer Network Liquid Crystal) as a light-absorbing material; employing a separate LCD structure; or applying an electrochromic material. However, the common disadvantages of the switchable privacy filters realized by those different methods are poor lateral transmission in the privacy mode, extremely low front transmission, slow switching between wide field mode and narrow field mode, deteriorated performance and driving stability in continuous mode switching, and so forth. Sustainable studies have been made in searching for a solution to those problems, still no apparent development of privacy filters that fit the needs.

DISCLOSURE

Technical Problem

It is therefore an object of the present invention to provide a privacy filter using electrochromic material and preparation method thereof, where the privacy filter has a considerably superior lateral transmission of light without deteriorating the fronttransmittance, achieves a fast switching between wide field mode and narrow field mode and secures excellences in filter performance and driving stability in continuous mode switching.

Technical Solution

To achieve the object of the present invention, there is provided a privacy filter that comprises: a first transparent substrate; a second transparent substrate positioned a predetermined distance apart from and opposite to the first transparent substrate; an electrolyte filled between the first and second transparent substrates; and a second transparent conductive layer disposed between the electrolyte and the second transparent substrate. The first transparent substrate comprises: an uneven pattern having a wire grid and trenches formed on the first transparent substrate; a first transparent conductive layer formed on the wire grid and the trenches of the uneven pattern; and an electrochromic layer being formed on the first transparent conductive layer along the sidewall of the wire grid and containing an electrochromic material to transmit or absorb visible light depending on whether an electrical signal is applied or not.

In this regard, the electrochromic layer is further formed on the first transparent conductive layer on the top of the wire grid and the bottom of the trenches of the uneven pattern. Preferably, the electrochromic layer is an inorganic material comprising Prussian Blue or a transition metal oxide.

Further, there is provided a method for preparing a privacy filter that comprises: (a) forming an uneven pattern having a grid and trenches on a first transparent substrate; (b) forming a first transparent conductive layer on the uneven pattern; (c) forming an electrochromic layer on the first transparent conductive layer of the uneven pattern; and (d) using a second transparent substrate with a second transparent conductive layer formed thereon to dispose a spacer between the substrate of the step (c) and the second transparent substrate, injecting an electrolyte, and then bonding and sealing the two substrates together.

The method further comprises: dry-etching the electrochromic layer formed on the first transparent conductive layer on the top of the wire grid and the bottom of the trenches, after the step (c) of forming the electrochromic layer on the first transparent conductive layer.

The step (c) of forming the electrochromic layer comprises forming Prussian Blue or a transition metal compound using electro-deposition plating at a current density of 30 to 60 $\mu A/cm^2$.

Advantageous Effects

The present invention forms an electrochromic layer consisting of an inorganic material only on the portions of a transparent conductive layer having an uneven pattern or on the sidewall of the transparent conductive layer by using the electro-deposition plating method, thereby effectively blocking the lateral transmission of light without a loss of the front transmittance in the private mode, achieving a fast switching between wide field mode and narrow field mode, and securing excellences in filter performance and driving stability even with a continuous switching of modes.

BEST MODE

Hereinafter, a detailed description will be given as to the present invention.

The present invention relates to a switchable privacy filter applicable to a display.

Unlike the general privacy film of which the blocking layer is of a simple wire grid structure, the present invention provides a privacy filter structure having a thin block layer conformally formed on a high-aspect-ratio uneven pattern having a wire grid and trenches or only on a sidewall of a wire grid structure.

Further, the present invention uses an inorganic material as an electrochromic material forming the blocking layer, and employs electroplating, such as electro-deposition plating, rather than the conventional sputtering method.

Accordingly, the present invention can achieve a fast switching between wide field mode and narrow field mode (i.e., privacy mode) immediately after reception of electrical signals and block the lateral transmission of light without deterioration of the front transmittance in the privacy mode.

Hereinafter, a description will be given as to a privacy filter and its preparation method according to the preferred embodiment of the present invention with reference to the accompanying drawings.

Figure 1:
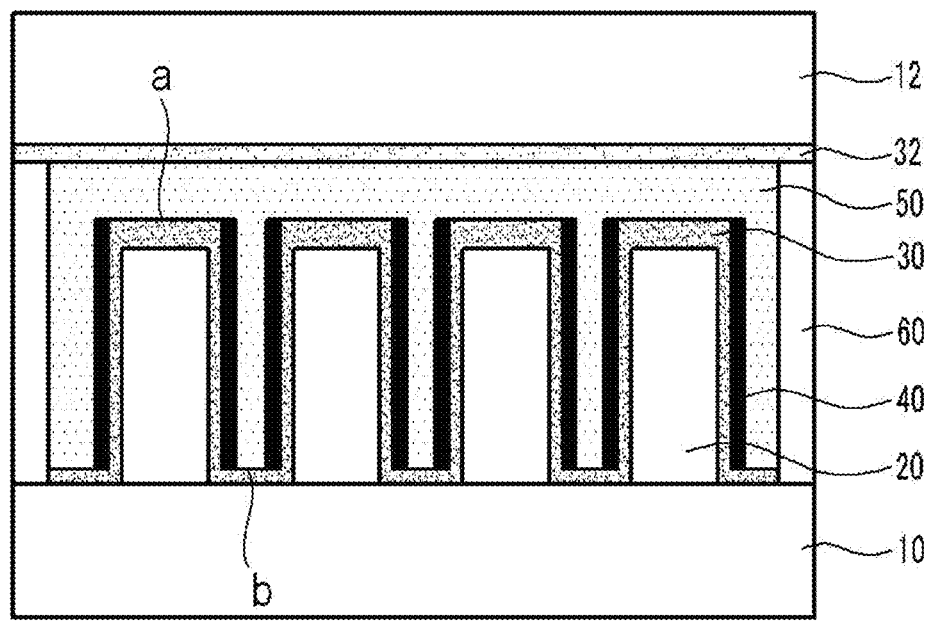
FIG. 1 is a mimetic diagram schematically showing the structure of a privacy filter according to one embodiment of the present invention.
Figure 2:
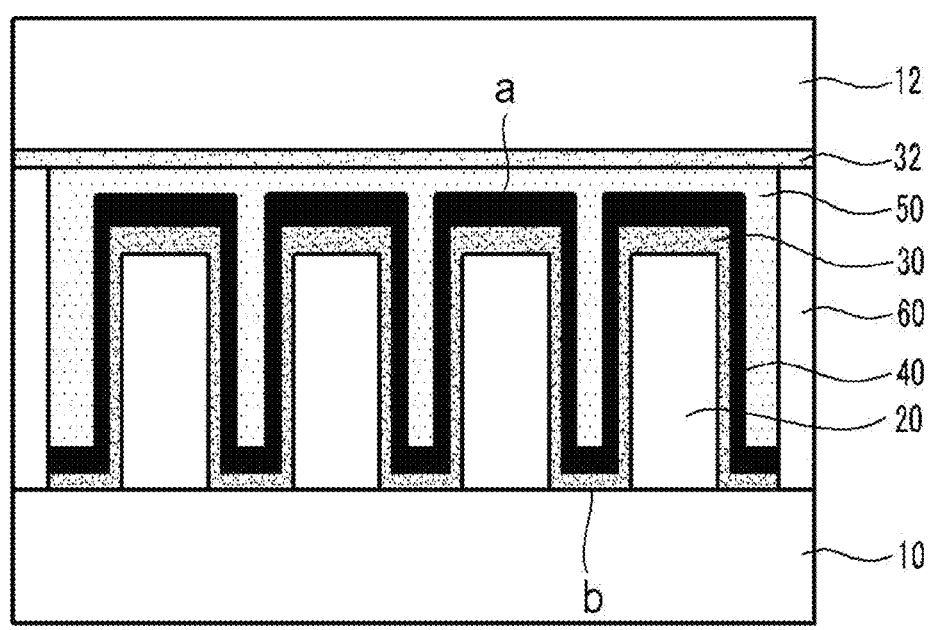
FIG. 2 is a mimetic diagram schematically showing the structure of a privacy filter according to another embodiment of the present invention.

FIG. 1 is a mimetic diagram schematically showing the structure of a privacy filter according to one embodiment of the present invention; and FIG. 2 is a mimetic diagram schematically showing the structure of a privacy filter according to another embodiment of the present invention.

As illustrated in FIGS. 1 and 2, the privacy filter of the present invention basically comprises: a first transparent substrate 10; a second transparent substrate 12 positioned a predetermined distance apart from and opposite to the first transparent substrate 10; an electrolyte 50 filled between the two substrates; and a second transparent conductive layer 32 disposed between the electrolyte 50 and the second transparent substrate 12. The privacy filter further comprises a spacer 60 positioned on both ends of the first and second transparent substrates 10 and 12 to immobilize the two substrates.

The first transparent substrate 10 comprises a high-aspect-ratio uneven pattern 20 having a wire grid and trenches; a first transparent conductive layer 30 formed on the wire grid and trenches of the uneven pattern; and an electrochromic layer 40 containing an electrochromic material to transmit or absorb visible light depending on whether an electrical signal is applied or not.

Preferably, the uneven pattern 20 comprises a wire grid and trenches at predetermined intervals on the first transparent substrate 10 to have a high aspect ratio.

More preferably, the uneven pattern has such a structure that the wire grid and the trenches are about 10 μm or less in width, with the trench aspect ratio (depth-to-width ratio) of at least about 2 as represented by the following equation 1.

Trench aspect ratio=Trench depth/Trench width    [Equation 1]

To make the wire grid pattern invisible, the width of the wire grid and the trenches in the uneven pattern is preferably about 10 μm or less, more preferably about 1 μm or less. More specifically, when the trench width is greater than 10 μm, the wire grid pattern is viewed to scatter the screen of the display, which is inappropriate to the privacy filter. Further, when the aspect ratio (depth-to-width ratio) of the trench as represented by the equation 1 is below 2, the lateral brightness does not decrease sufficiently even in the narrow field mode, which results in failure to function as a privacy filter. In this regard, the uneven pattern may be an insulation layer formed from a photoresist material.

The first transparent conductive layer 30 is conformally formed on the wire grid and trenches of the uneven pattern 20 to give an uneven pattern structure.

The electrochromic layer 40 is preferably formed on the first transparent conductive layer 30 along the sidewall of the wire grid. When needed, the electrochromic layer 40 may be further formed selectively on the first transparent conductive layer 30 on the top of the wire grid and the bottom of the trenches of the uneven pattern.

Accordingly, the privacy filter according to one preferred embodiment of the present invention comprises, as shown in FIG. 1, the first transparent substrate 10; the second transparent substrates 12 positioned a predetermined distance apart from and opposite to the first transparent substrate 10; the electrolyte 50 filled between the first and second transparent substrates 10 and 12; and the second transparent conductive layer 32 disposed between the electrolyte 50 and the second transparent substrate 12. Further, the first transparent substrate 10 may comprise: the uneven pattern 20 having a wire grid and trenches as formed on the first transparent substrate 10; the first transparent conductive layer 30 formed on the wire grid and the trenches of the uneven pattern; and the electrochromic layer 40 being formed on the first transparent conductive layer 30 along the sidewalls of the wire grid and containing an electrochromic material which transmits or absorbs the visible light according to whether an electrical signal is applied or not. Between the two substrates is disposed the spacer 60. In this structure, the electrochromic layer 40 is not formed on the first transparent conductive layer 30 on the top (a) of the wire grid and the bottom (b) of the trenches of the uneven pattern but only on the first transparent conductive layer along the sidewalls of the wire grid and the inside of the trenches.

Further, the privacy filter according to another preferred embodiment of the present invention comprises, as shown in FIG. 2, the first transparent substrate 10; the second transparent substrates 12 positioned a predetermined distance apart from and opposite to the first transparent substrate 10; the electrolyte 50 filled between the first and second transparent substrates 10 and 12; and the second transparent conductive layer 32 disposed between the electrolyte 50 and the second transparent substrate 12. In this regard, the first transparent substrate 10 may comprise: the uneven pattern 20 having a wire grid and trenches as formed on the first transparent substrate 10; the first transparent conductive layer 30 formed on the wire grid and the trenches of the uneven pattern; and the electrochromic layer 40 being formed on the first transparent conductive layer 30 on the wire grid and trenches of the uneven pattern and containing an electrochromic material which transmits or absorbs the visible light depending on whether an electrical signal is applied or not. Between the two substrates is disposed the spacer 60. In this structure, the electrochromic layer 40 is also formed on the first transparent conductive layer 30 on both the top (a) of the wire grid and the bottom (b) of the trenches of the uneven pattern.

Figure 3:
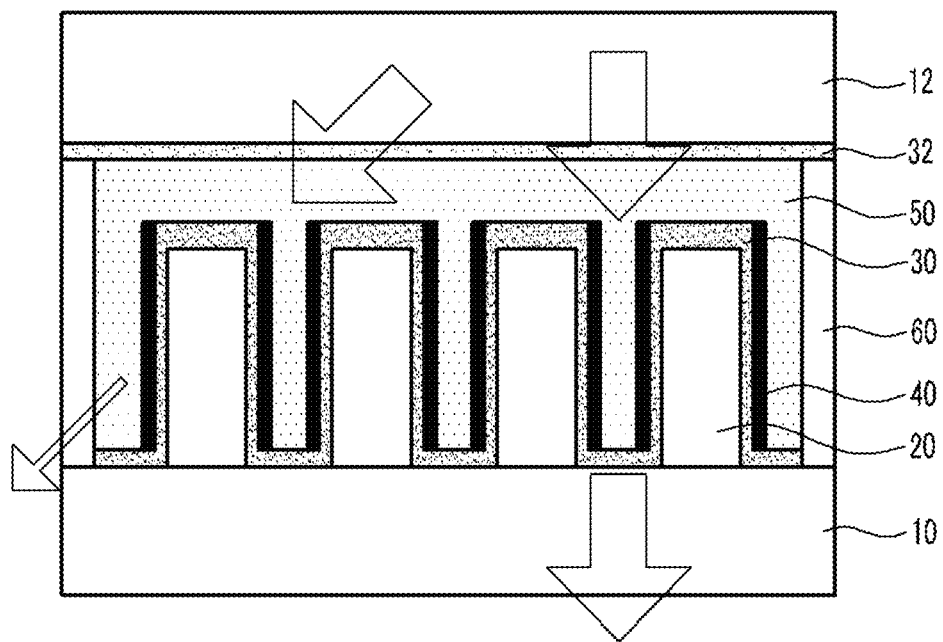
FIG. 3 is a mimetic diagram showing the principles of the wide field mode and the narrow field mode when the current is applied to the privacy filter of the present invention.

The structure of FIG. 1 is more preferred in the present invention, which is thus enabled to effectively block the lateral transmission of light without deteriorating the front transmittance in the privacy mode. FIG. 3 is a mimetic diagram showing the principles of the wide field mode and the narrow field mode when the electrical current is applied to the privacy filer of the present invention.

As illustrated in FIG. 3, when the electrical current is applied to the switchable privacy filter in which the first transparent substrate including the uneven pattern is connected to the negative (−) electrode, and the second transparent substrate is connected to the positive (+) electrode, the transmittance of light results in discoloration of the electrochromic layer to switch the wide field mode on. Upon application of the current in the reverse direction, the electrochromic layer is colored to switch the narrow field mode (i.e., privacy mode) on. In the privacy mode, the structure of the present invention may have a front transmittance of at least about 60% at wavelength of 650 nm and a lateral transmission of about 10% or less at the 45° viewing angle. More preferably, the present invention may have a front transmittance of at least about 80 % at wavelength of 650 nm and a lateral transmission of about 5% or less at the 45° viewing angle.

Hereinafter, a detailed description will be given as to a method for preparing a privacy filter according to the preferred embodiment of the present invention with reference to the accompanying drawings.

FIGS. 4 to 7 are mimetic diagrams showing the preparation process for a privacy filter according to one embodiment of the present invention.

Firstly, the preparation method for a privacy filter of the present invention comprises: (a) forming an uneven pattern having a wire grid and trenches on a first transparent substrate; (b) forming a first transparent conductive layer on the uneven pattern; (c) forming an electrochromic layer on the first transparent conductive layer of the uneven pattern; and (d) using a second transparent substrate with a second transparent conductive layer formed thereon, to position a spacer between the substrate of the step (c) and the second transparent substrate, injecting an electrolyte, and then bonding and sealing the two substrate together to complete a switchable privacy filter.

The step (a) is forming a high-aspect-ratio trench pattern on a transparent substrate or producing a transparent substrate having a high-aspect-ratio trench pattern. But, the method of forming a high-aspect-ratio uneven pattern in the present invention is not limited to the above-specified method and may include any kind of known methods in the related art.

In this regard, the step of forming a high-aspect-ratio trench pattern on a transparent substrate may employ photolithography using a material for forming an insulation layer. Further, the step of producing a transparent substrate having the high-aspect-ratio trench pattern may use the master molding method or physical processing method.

Preferably, the step (a) of forming the uneven pattern includes forming an uneven pattern on the first transparent substrate using the photolithography, master molding, or physical processing method.

The photolithography method may include applying a coating of a photosensitizer or a high-transmission photoresist onto the first transparent substrate and performing a mask exposure to form the uneven pattern. The material for forming an insulation layer as used herein is not specifically limited and may include a photosensitizer or a general high-transmission thick photoresist, such as SU-8.

In addition to the photolithography method, the method for forming a high-aspect-ratio pattern may use a method of providing a high-aspect-ratio master mold and then duplicating a polymer film using a thermal setting or UV-setting polymer resin; or a method of directly processing the first transparent substrate with a laser or mechanical means to form an uneven pattern with a high aspect ratio.

Figure 4:
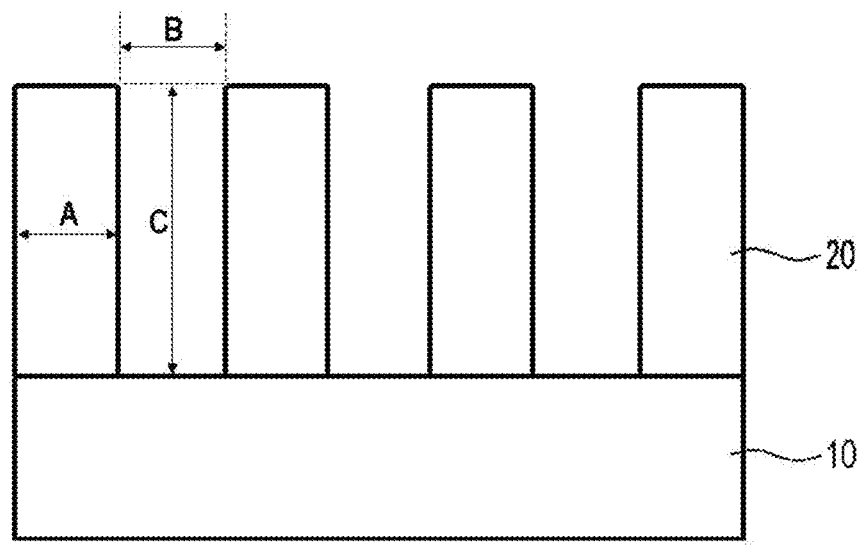
FIG. 4 is a mimetic diagram showing a method of forming an uneven pattern on a first transparent substrate in the fabrication process for a privacy filter according to one embodiment of the present invention.

In this regard, the step (a) will be described by exemplifying a method of forming a high-aspect-ratio uneven pattern on a transparent substrate. FIG. 4 is a mimetic diagram showing a method of forming an uneven pattern on the first transparent substrate in the preparation process for a privacy filter according to one embodiment of the present invention.

Referring to FIG. 4, a coating of a material for forming an insulation layer is applied onto the first transparent substrate 10 using a photoresist and then subjected to mask exposure to form the high-aspect-ratio uneven pattern 20 having a wire grid and trenches.

To form the high-aspect-ratio uneven pattern having a wire grid and trenches, the present invention preferably controls the width (A) of the wire grid pattern and the pitch of the grid pattern.

In the uneven pattern structure formed on the first transparent substrate 10, the wire grid width (A) and the trench width (B) are preferably controlled to be unnoticeable in the range of about 10 μm or less, preferably about 1 μm or less. As the higher trench aspect ratio is favored in view of blocking the lateral light transmission, the high-aspect-ratio uneven pattern is constructed so that the trench aspect ratio as represented by the following equation 1 based on the trench width (B) is preferably at least about 2, more preferably 3 to 4.

Trench aspect ratio=Trench depth (C)/
    Trench width (B)     [Equation 1]

The first transparent substrate is not specifically limited and may be a transparent glass substrate, a transparent polymer film, or a transparent plastic substrate.

Figure 5:
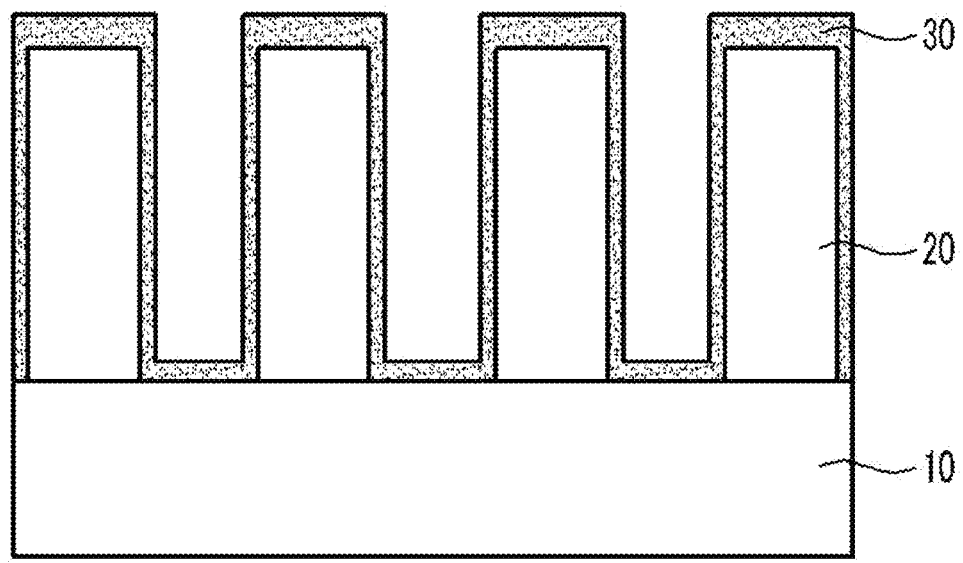
FIG. 5 is a mimetic diagram showing a method of forming a first transparent conductive layer on the uneven pattern of FIG. 4 in the fabrication process for a privacy filter according to one embodiment of the present invention.

The step (b) is, as illustrated in FIG. 5, forming a first transparent conductive layer 30 on the wire grid and trenches of the high-aspect-ratio uneven pattern 20. FIG. 5 is a mimetic diagram showing a method of forming a first transparent conductive layer on the uneven pattern of FIG. 4 in the preparation process for a privacy filter according to one embodiment of the present invention.

In the present invention, a first transparent conductive layer is deposited conformally on a high-aspect-ratio uneven pattern to have a predetermined thickness. In this regard, it is preferable to control the thickness of the first transparent conductive layer, because the deposition thickness and transparency of the first transparent conductive layer on the sidewall of the wire grid and trenches of the uneven pattern have an effect on the transmittance and the switching rate between wide field mode and narrow field mode for the switchable privacy filter. In other words, the extremely high thickness of the first transparent conductive layer on the sidewall of the wire grid and the inside of the trenches leads to a deterioration in the lateral transmission irrespective of the electrochromic material. Hence, the deposition thickness of the first transparent conductive layer on the sidewall of the wire grid and the inside of the trenches is preferably controlled in the range of about 20 to 200 nm.

The first transparent conductive layer is not specifically limited and may include any kind of transparent conductive layers generally used in preparation of devices, such as, for example, conductive metal film, ITO, FTO ($SnO_2$:F), ZnO, etc., preferably ITO.

Figure 6A:
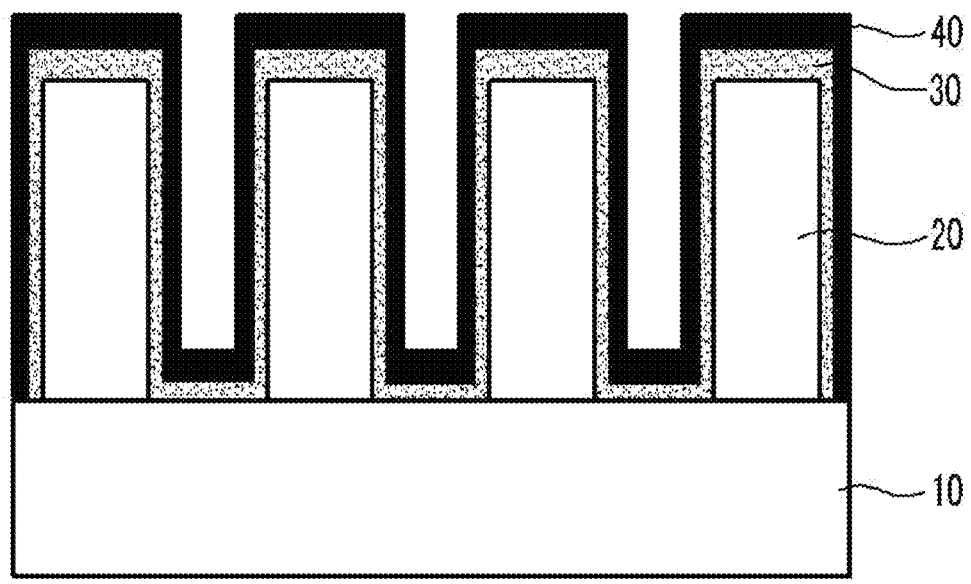
FIG. 6a is a mimetic diagram showing a method of forming an electrochromic layer on the first transparent conductive layer of FIG. 5 in the fabrication process for a privacy filter according to one embodiment of the present invention.

The step (c) is, as illustrated in FIG. 6a, forming an electrochromic layer 40 on the first transparent conductive layer 30 having the uneven pattern as formed in the step (b). FIG. 6a is a mimetic diagram showing a method of forming an electrochromic layer on the first transparent conductive layer of FIG. 5 in the preparation process for a privacy filter according to one embodiment of the present invention.

Referring to FIG. 6a, the process of electro-depositing an electrochromic layer (Prussian Blue) includes connecting the positive (+) electrode to the platinum (Pt) or graphite electrode and the negative (−) electrode to the substrate having the first transparent conductive layer in a mixed solution of $K_3[Fe(CN)_6]$, $FeCl_3 \cdot 6H_2O$] and HCl, and then electro-depositing Prussian Blue as an electrochromic layer. The electro-deposition is carried out at a current density of about 30 to 60 $\mu A/cm^2$. Through the electro-deposition, the electrochromic layer 40 is formed in a predetermined thickness entirely on the first transparent conductive layer 30 having the uneven pattern formed on the first transparent substrate 10. The thickness of the electrochromic layer is preferably about 10 nm to 1 μm, more preferably 100 to 500 nm.

If not specifically limited, the electrochromic material used in the structure of the present invention is preferably Prussian Blue, which costs less than transition metal oxides, such as $WO_3$ or $Li_xNi_yO_2$, or organic electrochromic materials, such as viologen. Further, Prussian Blue is most suitable as an electrochromic material in the aspect of the process in that the electrochromic layer can be formed conformally on the uneven pattern by electro-deposition rather than the sputtering process which highly costs. In other words, the present invention using the high-aspect-ratio uneven pattern may use a transition metal oxide, such as $WO_3$ or $Li_xNi_yO_2$, as well as Prussian Blue, but the preferred electrochromic material is Prussian Blue in the aspect of expense or process.

In this regard, the electrochromic layer electro-deposited entirely on the first transparent conductive layer of the high-aspect-ratio uneven pattern is used to reduce the front transmittance during the coloring (i.e., in the privacy mode). It is therefore more preferable to carry out a dry etching on a part of the electrochromic layer in the structure of FIG. 6a, as illustrated in FIG. 6b, in order to decrease the lateral transmission only without lowering the front transmittance when necessary.

Figure 6B:
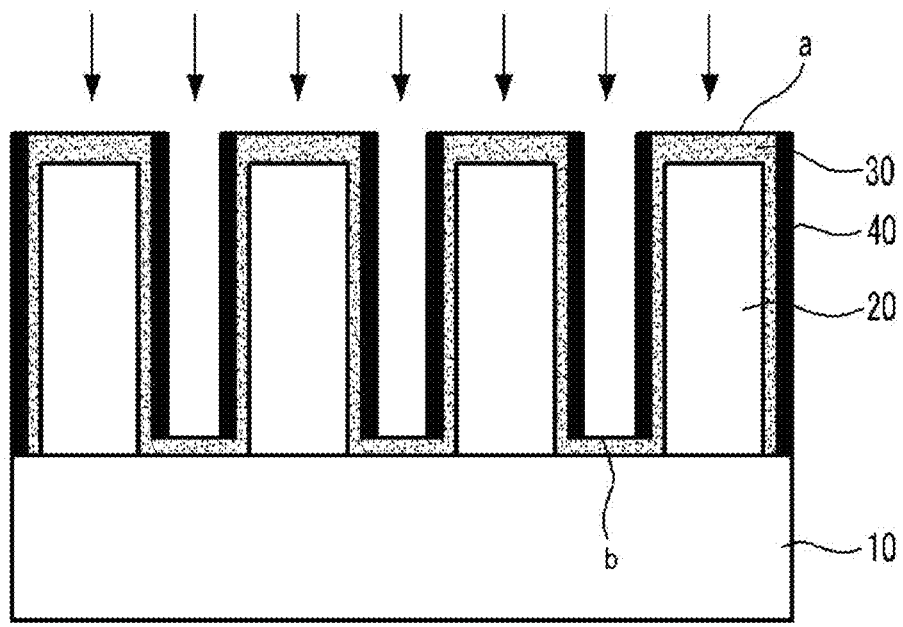
FIG. 6b is a mimetic diagram showing a method of dry-etching part of the electrochromic layer in the structure of FIG. 6a in the fabrication process for a privacy filter according to one embodiment of the present invention.

Referring to FIG. 6b, the method further comprises a step of dry-etching the electrochromic layer 40 formed on the first transparent conductive layer 30 on the top of the wire grid and the bottom of the trenches to remain the electrochromic layer only on the inner sidewall of the trenches of the uneven pattern, after the step (c) of forming the electrochromic layer on the first transparent conductive layer. This step eliminates the electrochromic 40 layer formed on the first transparent conductive layer 30 on the top (a) of the wire grid and the bottom (b) of the trenches of the uneven pattern to remain the electrochromic layer only on the sidewall of the wire grid and the inner sidewall of the trenches of the uneven pattern. The dry etching may use ICP RIE (Inductive Coupled Plasma Reactive Ion Etching). The etching gas as used herein is not specifically limited and may be argon (Ar) gas.

In this manner, the dry etching step results in the structure of FIG. 1. Without the dry etching step, the structure of FIG. 2 is completed. But, the dry etching step may be omitted if a loss of the front transmittance has nothing to do with the purpose of the privacy filter.

The conductive transparent substrate used in the step (d) is not specifically limited and may include ITO glass or ITO film, which is commonly used in the related art.

Figure 7:
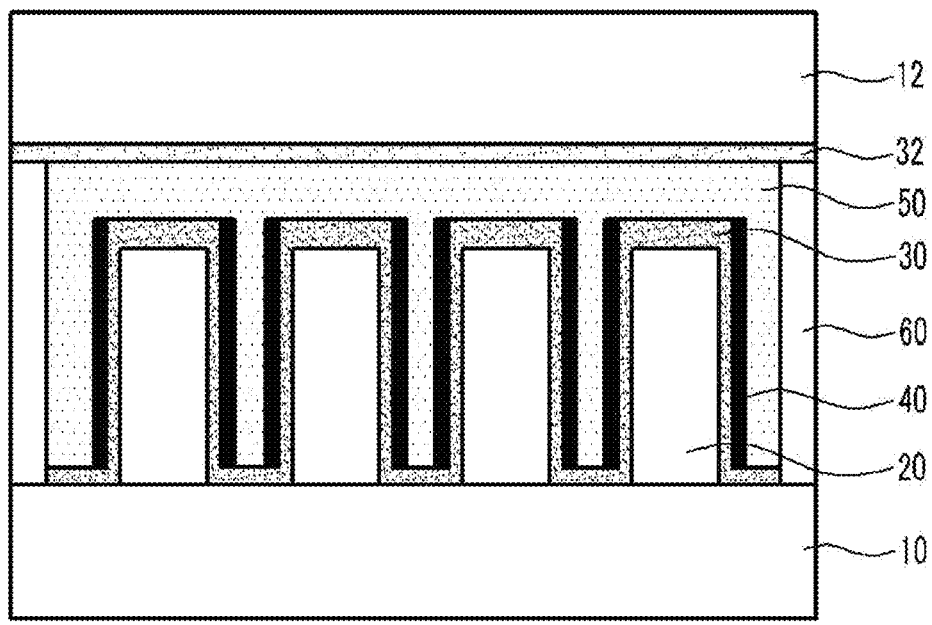
FIG. 7 is a mimetic diagram showing a method of fabricating a privacy filter using the structure of FIG. 6b and a second transparent substrate in the fabrication process for a privacy filter according to one embodiment of the present invention.

FIG. 7 is a cross-sectional view of a privacy filter prepared using the structure of FIG. 6b and a second transparent substrate, where the privacy filter comprises: a first transparent substrate 10 including a first transparent conductive layer 30 with the above-specified uneven pattern and an electrochromic layer 40; a second transparent substrate 12 disposed a predetermined distance apart from and opposite to the first transparent substrate 10; a spacer film 60 disposed between the first and second transparent substrates; and an electrolyte 50 injected between the two transparent substrate and blocked against leakage by adhesively bonding and sealing the two transparent substrates together.

The electrolyte as used herein may be at least one selected from the group consisting of aqueous solutions of KCl, HCl, or $LiClO_4$-propylene carbonate, preferably at concentration of about 0.2 to 2 M, more preferably at about 0.5 to 1.5 M. Further, the spacer film 60 is to keep the upper and lower substrates out of direct contact with each other and provide a space for injection of the electrolyte, and its type is not specifically limited but includes, for example, polymer film, or thin plastic or glass.

Mode for Invention

Hereinafter, the functions and effects of the present invention will be described in further detail by way of specified examples of the present invention, which are given for illustrations only and not intended to limit the scope of the present invention.

EXAMPLE 1

An AZ 4620 photoresist was applied to a thickness of 8 μm on a 0.63 t glass substrate and then exposed with a mask to form a high-aspect-ratio uneven pattern having the structure of FIG. 4. The high-aspect-ratio uneven pattern thus obtained had a wire grid pattern with a width of 2 μm and a pitch of 4 μm, where the aspect ratio of the wire grid and trench pattern was 4.

On the AZ 4620 uneven pattern with high aspect ratio was evenly deposited a 150 nm-thickness ITO layer on the top of the uneven pattern and the inner wall of the trenches (See. FIG. 5).

Subsequently, a mixed solution of 0.05 M K$_3$[Fe(CN)$_6$], FeCl$_3$·6H$_2$O, and HCl at volume ratio of 2:2:1 was prepared and used in electroplating Prussian Blue (an electrochromic layer), with the positive (+) electrode connected to the platinum (Pt) electrode and the negative (−) electrode connected to the substrate having the ITO uneven pattern (See. FIG. 6a). In this process, Prussian Blue was electro-deposited in thickness of 100 nm at a current density of 50 µA/cm$^2$.

Figure 8:
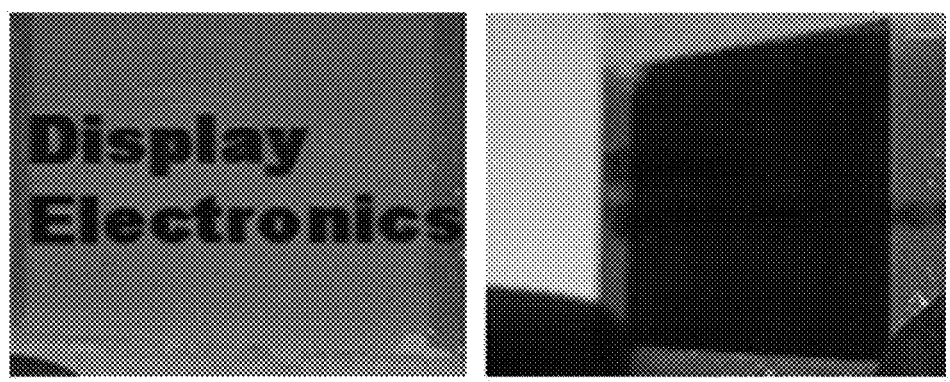
FIG. 8 shows the photographs of the privacy filter fabricated according to Example 1 of the present invention.

Then, ICP RIE (Inductive Coupled Plasma Reactive Ion Etching) using an Ar gas was conducted on the deposited Prussian Blue, leaving Prussian Blue only on the sidewalls, as shown in FIG. 6b. This process completed a first transparent substrate having an uneven pattern, where the Prussian Blue is formed only on the inner walls of the trenches other than the top (b) of the wire grid and the bottom (b) of the trenches in the ITO uneven pattern. A second transparent substrate was a glass with 150 nm-thickness ITO deposition. Between the first and second substrates was disposed a 30 µm-thickness spacer film and then injected an electrolyte (1 M KCl aqueous solution). The two substrates were adhesively bonded and sealed together to prevent leaks of the electrolyte, thereby completing a privacy filter (See. FIG. 8).

An electrical current was applied to the privacy filter in which the negative (−) electrode was connected to the first transparent substrate of the uneven structure, the positive (−) electrode connected to the second transparent substrate. This results in discoloration of the Prussian Blue to switch the wide field mode on. An application of an electrical current in the reverse direction led to coloration of the Prussian Blue to switch the narrow field mode (i.e., privacy mode) on.

Further, the switchable privacy filter had a front transmittance of 50% at wavelength of 600 nm and a lateral transmittance of 15% at a 45° viewing angle.

DESCRIPTION OF SIGNALS

10: FIRST TRANSPARENT SUBSTRATE
12: SECOND TRANSPARENT SUBSTRATE
20: HIGH-ASPECT-RATIO UNEVEN PATTERN
30: FIRST TRANSPARENT CONDUCTIVE LAYER
32: SECOND TRANSPARENT CONDUCTIVE LAYER
40: ELECTROCHROMIC LAYER
50: ELECTROLYTE
60: SPACER
A: WIDTH OF WIRE GRID IN UNEVEN PATTERN
B: WIDTH OF TRENCH IN UNEVEN PATTERN
C: DEPTH OF TRENCH IN UNEVEN PATTERN
a: TOP OF FIRST TRANSPARENT CONDUCTIVE LAYER ON WIRE GRID OF UNEVEN PATTERN
b: TOP OF FIRST TRANSPARENT CONDUCTIVE LAYER ON BOTTOM OF TRENCH IN UNEVEN PATTERN

What is claimed is:

1. A privacy filter controllably adjustable between a wide field viewing mode and a narrow field viewing mode, to block lateral viewing and to narrow viewing angle while retaining front viewing in the narrow field mode, comprising:

a first transparent substrate including a plurality of pattern elements in the form of a wire grid, each comprising a first sidewall portion, a top portion, and a second sidewall portion, and having a bottom portion between adjacent pattern elements, to form a plurality of trenches;

a second transparent substrate positioned a predetermined distance apart from and opposite to the first transparent substrate, and having a planar configuration;

an electrolyte filled between the first and second transparent substrates;

a second transparent conductive layer disposed between the electrolyte and the second transparent substrate;

a first transparent conductive layer formed on the first transparent substrate; and an electrochromic layer being formed on the first transparent conductive layer parallel to the sidewall of the wire grid of the first transparent substrate and containing an electrochromic material to transmit or absorb visible light responsive to an electrical signal applied to the first and second transparent conductive layers, wherein the electrochromic layer is an inorganic material comprising Prussian Blue or LiNiO$_2$.

2. The privacy filter as claimed in claim 1, wherein the electrochromic layer is further formed on the first transparent conductive layer on the top of the wire grid and the bottom of the trenches of the uneven pattern.

3. The privacy filter as claimed in claim 1, wherein the uneven pattern has a pattern structure with a wire grid and trenches being 10 µm or less in width and a trench aspect ratio (depth-to-width ratio) of at least 2 as represented by the following Equation 1:

Trench aspect ratio=Trench depth/Trench width    [Equation 1]

4. The privacy filter as claimed in claim 1, wherein the uneven pattern is an insulation layer formed from a photosensitizer.

5. The privacy filter as claimed in claim 1, wherein the electrochromic layer is 10 nm to 1 µm in thickness.

6. The privacy filter as claimed in claim 1, wherein the first transparent conductive layer has a sidewall thickness of 20 to 200 nm on the wire grid and inside the trenches of the uneven pattern.

7. The privacy filter as claimed in claim 1, wherein the first and second transparent conductive layers are selected from the group consisting of a conductive metal film, ITO, FTO, and ZnO.

8. The privacy filter as claimed in claim 1, wherein the first and second transparent substrates are a transparent glass, a polymer film, or a transparent plastic substrate.

9. The privacy filter as claimed in claim 1, further comprising:

a spacer for immobilizing the first and second transparent substrates.

10. A display device comprising the privacy filter as claimed in claim 1.

* * * * *